INVENTOR.
CARLISLE F. SMITH
BY
Emerson B Donnell
ATTORNEY

INVENTOR.
CARLISLE F. SMITH

United States Patent Office 2,770,184
Patented Nov. 13, 1956

2,770,184

BALING MACHINE

Carlisle F. Smith, Knoxville, Tenn., assignor to J. I. Case Company, Racine, Wis.

Application February 8, 1954, Serial No. 408,691

5 Claims. (Cl. 100—19)

This invention pertains to baling machines, and, more particularly, it pertains to automatic tying mechanisms such as those employed in hay balers or the like.

In the presently known automatic twine tie balers, there is usually provided a pair of twine needles which oscillate during the binding of bales. With this action there is an attending undesirable amount of vibration and bouncing of the needles and their related parts, particularly at the end of the needle retracting stroke. One effect is that the needles, in their retracting stroke, tend to bounce back momentarily into the baler chamber and at times are then damaged by the baler plunger. Also, the needle assembly vibrates causing inferior operation due in part to resulting poor timing of the moving parts and excessive strain placed upon the pivot pins of the operating parts. To presently cope with this problem balers are operated at speeds which are slower than what they could be otherwise. Also, balers are provided with needle brake bands which stop the needles but in doing so the bands bind the needle assembly.

It is therefore a primary object of this invention to provide a baler which minimizes or dampens the vibration of the baler needles in the tying operation.

A further object of this invention is to provide a baler which can be operated at speeds in excess of the speeds of presently known balers.

Still a further object is to provide a baler which requires a minimum of repair and maintenance attention as the operating needle assembly is not subjected to excessive strain.

Figure 1:
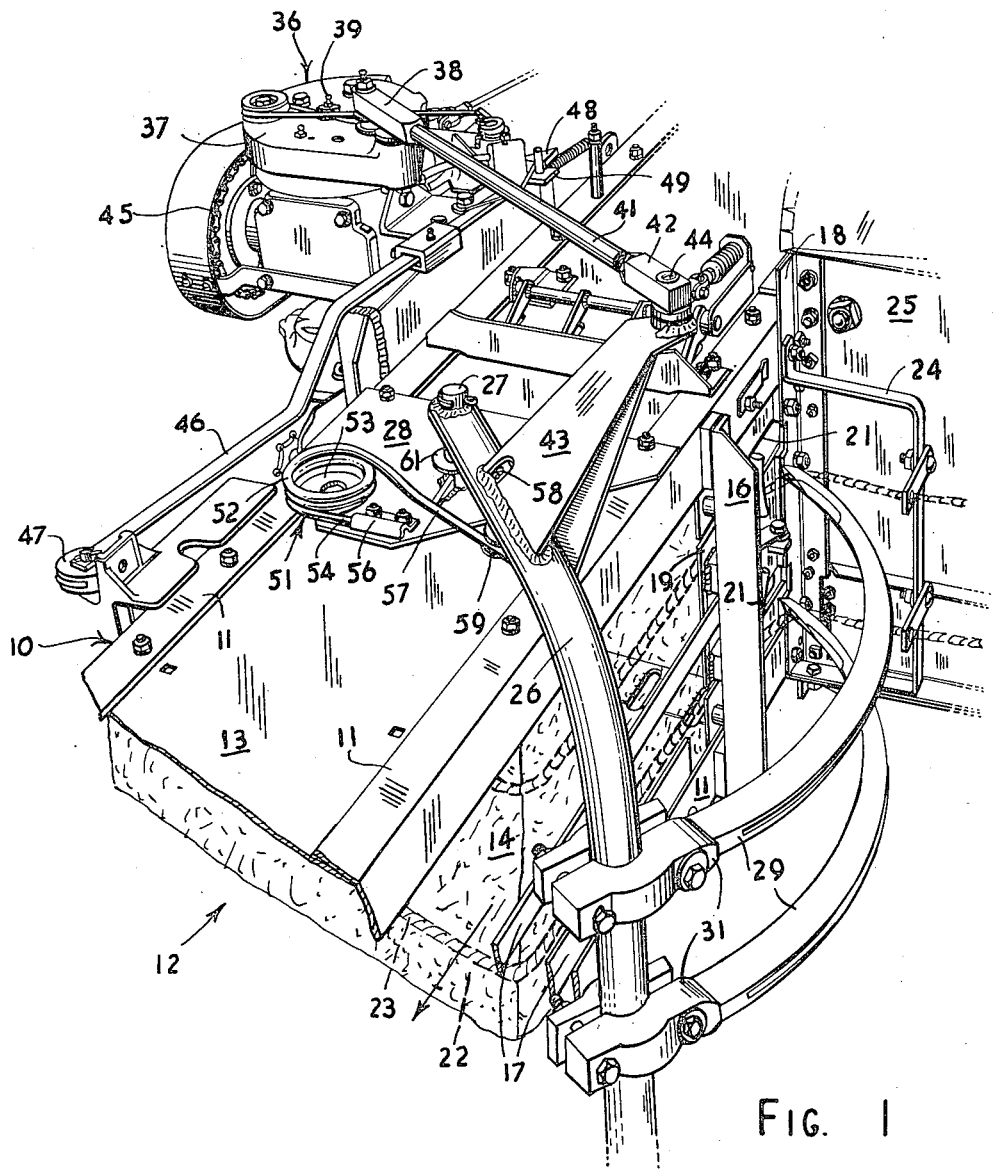

Other objects and advantages will become apparent upon reading the following description in conjunction with the accompanying drawings, in which, Fig. 1 is a fragmentary perspective view of a baler having a preferred embodiment of this invention.

Figure 2:
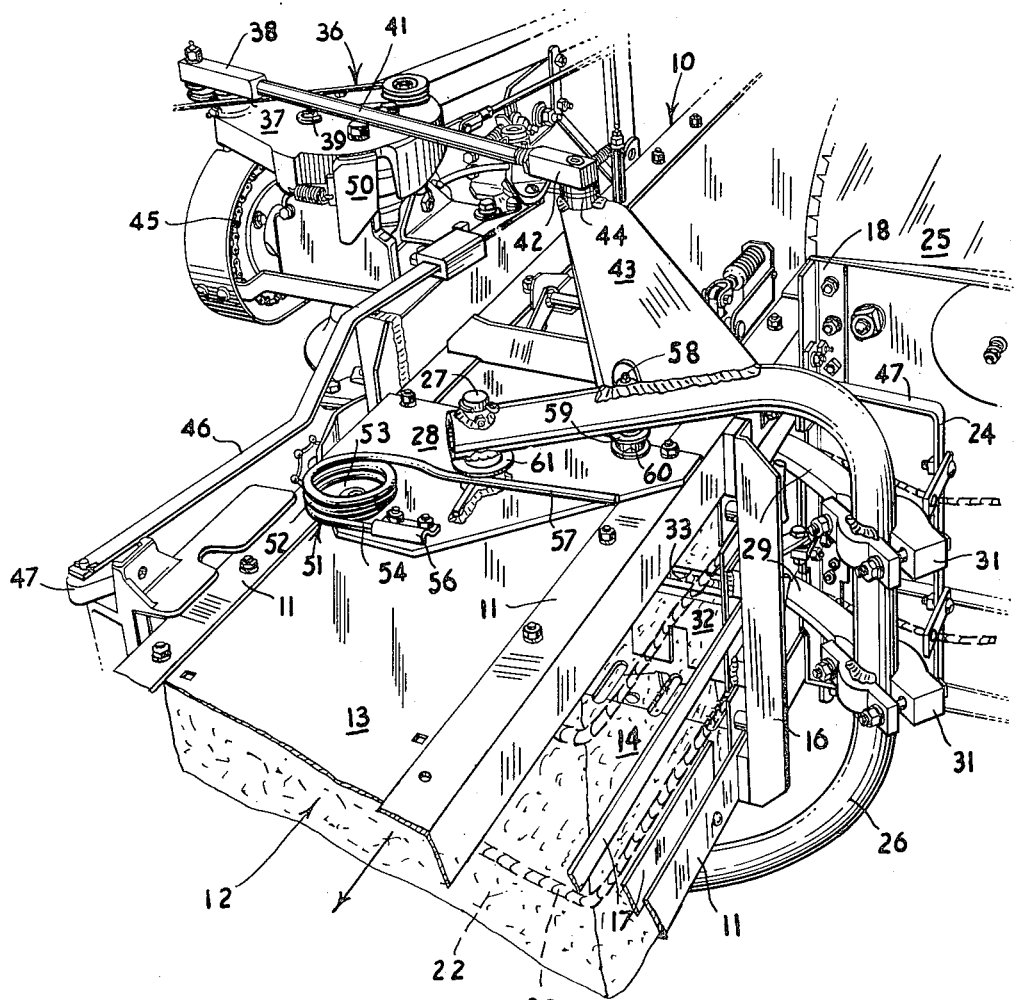

Fig. 2 is a fragmentary perspective view of the baler shown in Fig. 1 but with the working parts in a different position.

Similar reference numerals refer to the same parts throughout the several views.

Referring to Fig. 1, there is shown a fragment of a preferred embodiment of a baler having a section of an elongated and horizontally disposed frame 10 consisting of four angle irons 11 (only three being shown). Each of the irons 11 locates a corner of a then defined horizontal chamber 12 which receives bales of hay to be tied or bound all as shown.

Suitably bolted to the irons 11 is a top sheet 13 and a bottom sheet 14 each horizontally disposed to define the top and bottom of the chamber 12. To complete the chamber frame structure, there is preferably provided an angle iron 16 which is attached vertically to the side betweeen two of the irons 11. Also, horizontal side rails 17 and a vertically disposed side angle iron 18 are suitably attached to further form the sides of the chamber frame as shown. There is also a side rail assembly 19 which contains a pair of slots 21 for a purpose hereinafter described.

For clarity in the description of this invention, a bale of hay or straw 22 is represented to be disposed within the chamber 12 but shown in a phantom or transparent manner to avoid concealing the appearance of other parts of the baler. Also, twine or wire 23 is shown dotted in its normal position in the baler where it encloses the hay bales, as shown, after being positioned in a manner hereinafter described. A twine retainer bracket 24 is attached to the side of the angle iron 18 to provide a guide for the twine 23 as it moves from its spool or source (not shown).

Shown attached to the side of the chamber frame is a fragment of a feeder drum housing 25 which serves to deliver hay or the like into the chamber in a well known manner. It should then be understood that hay or the like is fed through the drum 25 to chamber 12 where the twine is wrapped around separated bales which are moved in chamber 12 in the direction shown by the arrow. The tying and moving operations are accomplished with the hereinafter described parts.

Pivotally mounted on the baler frame 10 is a post or yoke 26 with an upper end pivotally secured to a vertically disposed pin 27. The latter is mounted on a needle pivot bracket or plate 28 which is preferably bolted in a horizontal position across the top of the frame 10. It should be understood that a pivotal mounting exists underneath the frame 10 for pivotally securing the lower end of the yoke 26 as indicated in Fig. 2. Arcuately shaped needles 29 are adjustably attached by clamping ends 31 to the vertical disposed portion of the yoke 26 in a spaced apart relation as shown. At this time it is noted that the needles 29 oscillate during baler operation to move substantially between the two different positions shown in Figs. 1 and 2.

In moving from the position of Fig. 1, the needles enter the chamber 12 through the slots 21 and extend to the opposite side of the chamber. In this movement the twine 23 is fed across the chamber where it is tied by a conventional mechanism not shown. The twine 23 is of course threaded through the eyes of the needles, as indicated, and remains that way throughout the entire baling operation. After twine is strung across the chamber 12, a plunger 32 (shown in Fig. 2) moves along the chamber to push a bale in front of it. In this position, the bale pushed had twine strung across the front of it by the needles 29 when the bale front end was to the rear of the path of the needles across the chamber 12. The bale is then moved along the chamber by the plunger and the twine is strung out from the then retracted needles until the bale is enclosed on three sides by the twine. To complete the binding of the bale, the needles again cross the chamber 12 with two lines of twine. One line binds the fourth side of the bale and the second line serves to bind the front side of the following bale as the process is repeated. In this process the plunger 32 reciprocates to move the bales along while the needles 29 must be synchronized with the plunger movement. It should be noted that the plunger 32 contains two horizontally disposed upper and lower grooves 33 (only the lower groove being shown) which receive the needles when the plunger and the needles are in the position shown in Fig. 2. The grooves 33 are of limited dimensions and extend only a short distance into the plunger 32.

The preferred mechanism for driving the needle post 26 is a suitable linkage system connected between the post and a clutch assembly 36 which is mounted on the side of the chamber frame. Included in the assembly 36 is a clutch cover 37 which is rotatable between the two positions shown in Figs. 1 and 2. Suitably mounted on the top of the cover 37 is a connector 38 which is mounted to be rotatable relative to the cover 37 as shown. It should be noted that the center of rotation of the clutch cover is at 39 while the connector 38 is mounted eccentric thereto. Attached to the connector is a horizontally extending pitman rod or link 41 which attaches to a second connector 42 at a level above but offset from the needle post 26. Suitably rigidly attached to the post 26 in an inclined position is a bracket or link 43 which contains a pivot pin 44 at its upper end. The connector 42 is then rotatably mounted onto the pin 44 so the construction forms a pair of links connecting between the clutch 36 and the post 26. Thus, while the clutch rotates 180 degrees from the position shown in Fig. 1 to that shown in Fig. 2, the needle post and the needles are moved to their positions in Fig. 2. At this point the motion is temporarily interrupted as those moving parts stop. The clutch then rotates the remaining 180 degrees withdrawing the needles to the original position shown in Fig. 1, and the clutch again stops.

It should be noted that a clutch drive chain 45 is suitably mounted adjacent the clutch 36 to drive the latter from a source of power. Also a trip strap 46 is horizontally disposed adjacent the clutch 36 to operate the latter in response to the movement of bales through the chamber 12. The strap 46 is actuated by an eccentric member 47 and extends therefrom to a trip hook 48 to release it. This in turn releases a latch pin 49 which then actuates a clutch dog 50 shown in Fig. 2. With this conventional mechanism, the clutch 36 operates at the required moment to effect a twine stringing action.

Generally, the foregoing describes a conventional type of hay baler. Past experience with balers so constructed has disclosed the problem of the needles' being bent or broken by the plunger due to bouncing or vibration of the needle assembly when it should be retracted from the baler chamber. This bouncing occurs primarily when the needles and the post reach the position shown in Fig. 1. At this time it should be understood that the plunger is positioned in the chamber across the path of the needles, although it is not so shown in the drawings, but it has actually moved forward of the position shown in Fig. 2. This results in the plunger slots 33 moving forwardly beyond the needles to where the plunger would be struck by the needles if the latter entered the chamber 12.

Due to wear or the impracticality of close tolerances, the needle post is sometimes loosely fitted in its mounting; this might also be true of the fittings of the pitman rod. Then when the needles are retracted from the Fig. 2 position to the Fig. 1 position, there is a sudden stop which is encountered at approximately the position shown in Fig. 1 and due to loose fits of the moving parts, the needles bounce back into the baling chamber and are sometimes damaged.

To overcome the vibration and bounce described, a spring 51 is mounted on the plate 28 to engage the needle post in its movement. Thus the spring 51 has a coiled section 52 which is mounted on the plate 28 by engaging a boss or cylinder 53 attached to the plate. The spring 51 is maintained in position on the cylinder by having an extending end 54 anchored by a clip 56 which is suitably bolted to the plate 28 and which is provided with a section for engaging the spring end 54. The spring has an opposite end 57 extending freely from the coiled section 52 and it is this end of the spring that engages the needle post. The yoke 26 is preferably provided with a vertical pin 58 extending therethrough and upon the lower end of which is mounted a spring contact bushing 59 which is attached under the post 26 in a position which will bring it into contact with the spring when the post is moved to a position where the needles are approaching the end of their retraction stroke as shown in Fig. 1. The bushing 59 is preferably provided with a horizontally grooved surface 60 for receiving the spring end 57, all as shown.

Mounted on the pin 27 below the post 26, there is a circular plate 61 which serves as a spring pilot by having the spring end 57 engage it when that end is not in engagement with the bushing 59. (See Fig. 2.) In this manner an initial spring tension can be maintained on the spring so that an adequate spring resistance is available to engage the needle post just at the time the needles are leaving chamber 12.

From the foregoing description it will be seen that there is provided a baler which overcomes the problems of the needles vibrating and bouncing. The needle assembly, consisting of the needles, their support arm, and the driving mechanism, is thus controlled by a vibration dampener. With the foregoing described construction the needles are balanced in their operation and the bouncing is now dampened so that the needles are not damaged during operation.

A specific embodiment of this invention has been shown and described. However, the scope of this invention should be limited only by the appended claims.

I claim:

1. An automatic baling machine comprising in combination a frame, a needle support arm pivotally mounted on said frame, a pair of needles transversely extended from said arm, a power source connected to said arm for pivoting the latter to impart oscillating motion to said needles, a pre-loaded spring mounted on said frame at a point adjacent the pivot of said arm with a straight end extended from said point past the pivot of said arm whereby said spring is prevented from uncoiling by said pivot when said needles are at one end of said oscillating motion, means on said arm offset from said pivot to engage said straight end of said spring when said needles are at the opposite end of their oscillating motion.

2. An automatic tie baling machine comprising in combination a frame defining an elongated baling chamber, a needle support arm pivotally mounted on said frame to extend along a side thereof, a pair of needles attached to said arm and arranged to project into said chamber upon predetermined alternating pivotal action of said arm about its pivot and thereby impart oscillating motion to said needles whereby the latter enter and withdraw with respect to said chamber, a power drive connected to said arm to pivot the latter in alternating directions, a spring mounted on said frame at a point displaced from said pivot and including an extended finger, means on said arm displaced from said pivot in a position to engage said extended finger at a predetermined time of the withdrawal motion of said needles from said chamber, said spring being biased to press said finger against said means with a substantial force as said needles continue to be withdrawn whereby said finger is displaced and the resistance of said spring tends to retard the motion of said arm prior to the limit of withdrawal to avoid impact and vibratory rebound of said needles into said baling chamber.

3. An automatic binding tie baling machine comprising in combination a frame defining a bale chamber, a binding needle assembly, said assembly comprising a needle support arm pivotally mounted on said frame and a binding needle attached to said arm, a bushing attached to said arm offset from the pivot thereof, an intermittently operated power source connected to said arm to impart pivotal motion thereto, said needle being shaped and mounted on said arm to oscillate into and out of said chamber upon pivotal movement of said arm, a coil spring mounted on said frame with a straight end extended to engage said bushing upon the latter part of pivotal movement of said needle out of said chamber said spring and said bushing being arranged so that said straight end of said spring is pre-loaded when said bushing is not engaged with said spring.

4. In an automatic tying baling machine of the type comprising a frame defining an elongated baling chamber, a needle support arm pivotally mounted on said frame to extend along the side thereof, a needle attached to said arm and arranged to project into said chamber upon predetermined swinging of said arm about its pivot for extending said needle into said baling chamber, and a power drive connected to said arm to impart predetermined oscillating motion thereto, the combination of a coil spring mounted on said frame displaced from said pivot and having a finger-like end extending in a direction substantially parallel to said arm in one position thereof, and a finger-contacting abutment surface on said arm displaced from said pivot in position to contact said finger as said arm approaches a position wherein said needle is retracted from said baling chamber, said spring being biased to press said finger-like portion against said surface with substantial force as said arm continues to be retracted whereby said finger is displaced and the force of said spring tends to check the motion of said arm prior to the retracted limit of travel of said arm to avoid impact and vibratory rebound of said needle into said baling chamber.

5. In an automatic tying baling machine of the type comprising a frame defining an elongated baling chamber, a needle support arm pivotally mounted on said frame to extend along the side thereof, a needle attached to said arm and arranged to project into said chamber upon predetermined swinging movement of said arm about its pivot for extending said needle into said baling chamber, means defining limits of movement of said arm, and a power drive connected to said arm to impart predetermined oscillating motion thereto between said limits, the combination of a coil spring mounted on said frame displaced from said pivot and having a finger-like end extending in a direction substantially parallel to said arm in one position thereof, and a finger-contacting abutment surface on said arm displaced from said pivot in position to contact said finger as said arm approaches one of said limits of movement wherein said needle is retracted from said baling chamber, said spring being biased to press said finger-like end against said surface with substantial force as said arm continues to a retracted position at said limit of movement, whereby said finger is displaced and the force of said spring tends to check the motion of said arm prior to its reaching said limit of movement to avoid impact and vibratory rebound of said needle into said baling chamber.

References Cited in the file of this patent
UNITED STATES PATENTS

| | | |
|---|---|---|
| 1,348,180 | Leavitt | Aug. 3, 1920 |
| 2,516,445 | Barnhill | July 25, 1950 |
| 2,610,573 | Altgelt | Sept. 16, 1952 |
| 2,651,252 | Pope | Sept. 8, 1953 |